United States Patent [19]
Cockroft

[11] 3,945,298
[45] Mar. 23, 1976

[54] KEY CUTTING MACHINE

[76] Inventor: Darrel Cockroft, 232 Bradford Road, Frizinghall, Shipley, Yorkshire, England

[22] Filed: Apr. 25, 1974

[21] Appl. No.: 464,226

[52] U.S. Cl. .................................. 90/13.05; 76/110
[51] Int. Cl.² ........................................... B23C 1/16
[58] Field of Search ..................... 90/13.05; 76/110

[56] References Cited
UNITED STATES PATENTS

| | | | |
|---|---|---|---|
| 2,148,668 | 2/1939 | Yoskowitz et al. | 90/13.05 |
| 3,118,346 | 1/1964 | Simon | 90/13.05 |
| 3,424,056 | 1/1969 | Stolove et al. | 90/13.05 |

*Primary Examiner*—J. M. Meister
*Attorney, Agent, or Firm*—Robert E. Burns; Emmanuel J. Lobato; Bruce L. Adams

[57] ABSTRACT

An apparatus for producing copies of keys comprises a pair of vertically spaced clamps, one of which clamps the key to be duplicated and the other of which clamps the key blank to be cut. A movable carriage carries, in vertically spaced relationship, a stylus for tracing the contours of the key being duplicated and a driven cutter for cutting the key blank. A drive mechanism drives the carriage through a working stroke carrying the stylus and cutter, respectively, along the length of the key and key blank so as to cut the key blank into the shape of the key, and a cam arrangement thereafter displaces the carriage laterally so that the drive mechanism returns the carriage through a return stroke while maintaining the stylus and cutter out of contact with the keys.

11 Claims, 5 Drawing Figures

U.S. Patent   March 23, 1976   Sheet 1 of 2   3,945,298
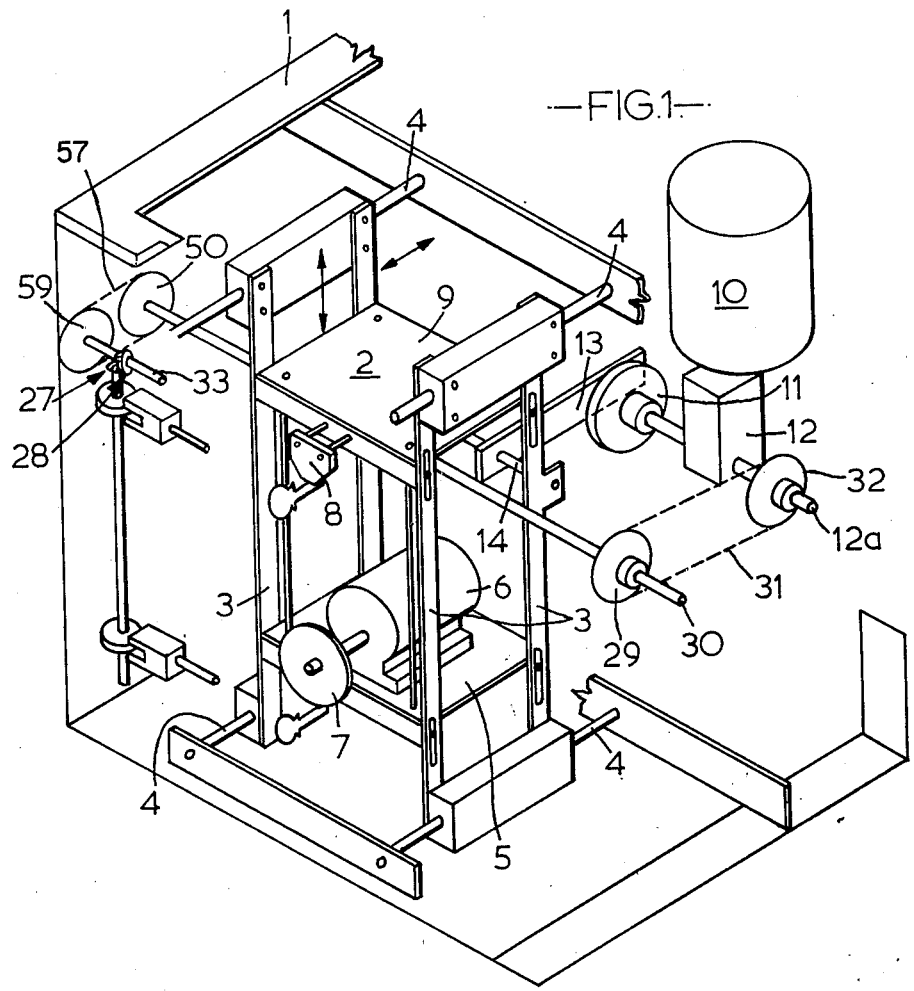
—FIG.1—
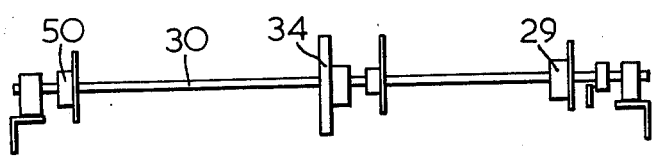
—FIG.2—

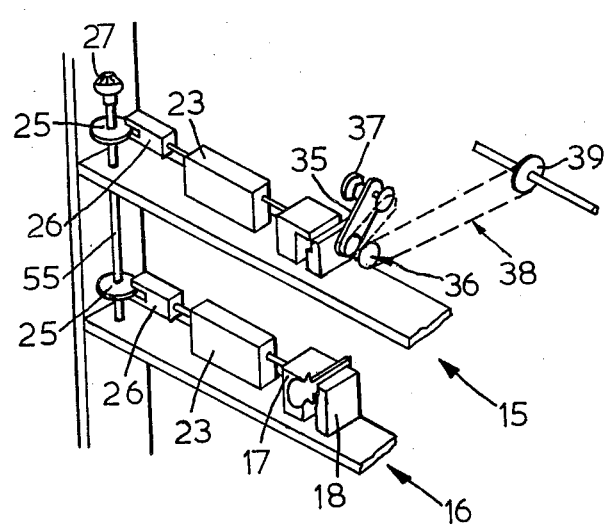
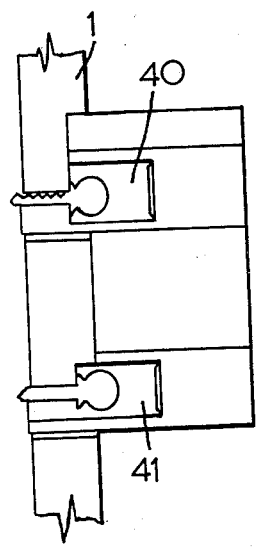
—FIG.3.—   —FIG.4.—
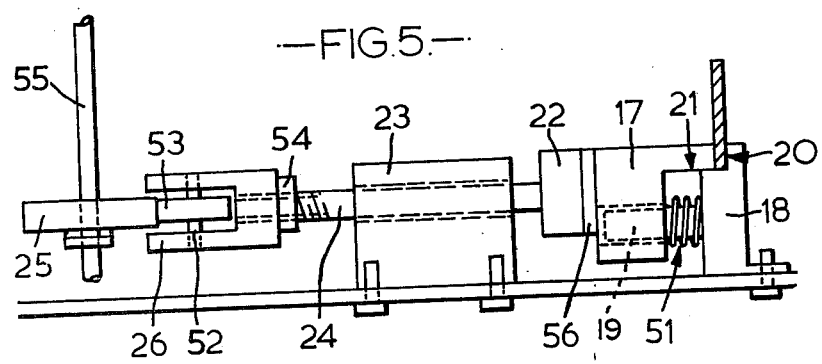
—FIG.5.—

KEY CUTTING MACHINE

This invention relates to key-cutting machines.

According to one aspect of the invention a method of producing copies of cut-keys comprises the steps of clamping a cut key at a stylus station; clamping an uncut key at a cutting station; causing a stylus to follow the contours of the cut key in a longitudinal direction, which stylus controls the movement of a cutter, so that the cutter cuts the same contours into the uncut key as are present in the cut key; causing the stylus and cutter to return to their original positions in the opposite longitudinal direction with the stylus and cutter travelling out of contact with cut key and uncut key respectively during movement in the opposite direction; and unclamping the two keys.

According to another aspect of the invention an apparatus for carrying out the above method of producing copies of cut keys comprises first and second clamping means for respectively clamping a cut key and an uncut key; a stylus for engagement with the contours of the cut key held in the first clamping means; a power driven cutter for engagement with the uncut key held in the second clamping means, the stylus and cutter being so connected that the cutter moves through the same distance as the stylus in any direction; driven mechanism adapted to move both the stylus and the cutter in a longitudinal direction relatively to the cut key and the uncut key; the stylus and cutter being free to move laterally with respect to the said longitudinal direction to enable the stylus to follow the contours of the key, and both the stylus and the cutter being adapted to travel in the opposite longitudinal direction laterally displaced respectively from the contours of the key and cut key.

Preferably, the stylus is adapted to follow the contours of the cut key in one direction of its movement in the longitudinal direction and take up a position laterally displaced from the contours of the cut key during its movement in the opposite direction.

According to a further aspect of the invention an apparatus for carrying out the above method of producing copies of cut keys first and second clamping means for respectively clamping a cut key and an uncut key; a stylus for engagement with the contours of the cut key held in the first clamping means; a power driven cutter for engagement with the uncut key held in the second clamping means, the stylus and cutter being so connected that the cutter moves through the same distance as the stylus in any direction; driven mechanism adapted to move both the stylus and the cutter in a longitudinal direction relatively to the cut key and the uncut key; the stylus and cutter being free to move laterally with respect to the said longitudinal direction to enable the stylus to follow the contours of the key, the freedom for lateral movement being provided by the mounting of the stylus and the cutter upon support means which is or are guided normally to the said longitudinal direction.

One construction of an apparatus for carrying out a method of key cutting in accordance with the invention and its method of operation will now be described by way of example only, and with reference to the accompanying drawings in which:

FIG. 1 is a diagrammatic perspective view of a key-cutting machine, with the casing removed to show the working parts, FIG. 2 is a diagrammatic front view of a lifting cam shaft of the machine shown in FIG. 1, FIG. 3 is a diagrammatic perspective view of clamping and positioning means for holding keys to be processed by the machine shown in FIG. 1, FIG. 4 is a diagrammatic side view of locating means for keys to be processed by the machine shown in FIG. 1, and, FIG. 5 is a vertical section through the upper clamping and positioning means shown in FIG. 3.

A machine for cutting keys has a general framework 1 which carries various inter-related mechanisms as will be hereinafter described. The framework 1 is enclosed by an outer case (not shown).

A carriage 2 is located within this frame and is slideable vertically within guides 3 which in turn are carried on horizontal rods 4 and are slideable longitudinally thereof from front to rear of the machine. A bottom plate 5 of the carriage supports an electric motor 6 and a rotary milling cutter 7 is located on the spindle of this motor. Above the rotary cutter 7 a stylus is held in position on a stylus block 8 fastened to a top plate 9 of the carriage.

A second electric motor 10 is provided within the framework 1 at the rear of the carriage 2 and this motor drives a crank wheel 11 through a reduction gear box 12 and a shaft 12a. The crank wheel 11 is connected by a connecting rod 13 to a rod 14 fastened to the rear of the carriage 2 so that the crank wheel 11 is adapted to cause slow horizontal reciprocation of the carriage 2.

A chain sprocket wheel 32 is fastened to the shaft 12a and a chain 31 passes around this sprocket wheel 32. The chain also passes around a sprocket wheel 29 which is fastened onto a lifting cam shaft 30. The lifting cam shaft 30 extends across the whole width of the machine and passes below the top plate 9 of the carriage. At a position along the lifting cam shaft 30 beneath the top plate 9 of the carriage there is provided a lifting cam 34. The top plate 9 of the carriage rests on the periphery of this lifting cam 34.

Thus for each revolution of the shaft 12a, the carriage is reciprocated horizontally once, that is to say it moves from its rearmost position to its foremost position and back to its rearmost position.

The shape and situation of the lifting cam 34 is such that during the movement of the carriage from its rearmost position to its foremost position the carriage 2 is lifted to a predetermined height above the normal path it moves through on the return stroke when resting on the lifting cam. However the carriage is free to move through an undulating path if acted upon to do so during the return stroke.

At the front of the frame work 1 there are provided two sets of clamping means 15 and 16 associated respectively with each of the stylus block 8 and the rotary cutter 7 as shown in FIG. 3. The two sets of clamping means are identical so that only one will be described in detail.

Two jaws 17 and 18 are provided for clamping the cut key or blank as the case may be, the jaw 18 being fixed to part of the fixed frame work of the machine, and the jaw 17 being slideable on a short horizontal guide rod 19, which extends laterally from the fixed jaw 18.

A rebate or recess 20 is formed in the top of the fixed jaw, and the slideable jaw has a complementary formation 21, so that when the slideable jaw 17 closes onto the fixed jaw 18, there is a narrow slot between the side of the rebate 20 and the facing portion of the slideable jaw 17 between which the shank of a cut key or key blank can be nipped. The jaws 17 and 18 therefore, provide a means of holding the cut key or key blank in a position such that the shank of the key is generally horizontal with its flanks in vertical planes, and the contoured edge uppermost.

The guide rod 19 is secured in the fixed jaw 18 and extends into the slideable jaw 17 and a compression spring 51 surrounds the guide rod 19 and acts between the jaws. Beyond the slideable jaw 17 there is a ram head 22 which is fastened to one end of a cam follower rod 24. A rubber or like resilient pad 56 is positioned between the slideable jaw 17 and the ram head 22.

A bearing block 23 at one side of the jaws supports the cam follower rod 24 which is slideable in the same sense as the slideable jaw 17. The cam follower rod is screw-threaded at the opposite end to that end holding the ram head 17 and a cam follower block 26 is screwed onto the cam follower rod. The cam follower block carries an axle 52 upon which is rotatably mounted a cam follower 53. The cam follower 53 engages with a clamping cam 25. A locking nut 54 is also provided on the screw threaded portion of the cam follower rod 24.

The effective length of the cam follower rod can thus be adjusted in the following manner. The locking nut 54, which is normally screwed tightly against the cam follower block 52, is slackened. The cam follower rod is rotated which effectively changes the distance between the ram head 22 and the cam follower block 52. The locking nut 54 is then again tightened thereby securing the cam follower rod 22 to the cam follower block 52 in the adjusted position.

Two clamping cams 25 are fastened to a vertically disposed clamping cam shaft 55 (as shown in FIG. 3). A bevel gear 27 is keyed to the top of the cam clamping shaft 55 and this bevel gear engages with a bevel gear 28 which is fastened to a front shaft 33. A chain sprocket wheel 59 is also keyed on the front shaft and a chain 57 passes around this chain sprocket wheel 59 and around a chain sprocket wheel 50. The latter is fastened to the lifting cam shaft 30, and the drive to the clamping means is thus derived from the lifting cam shaft 30.

Key feeding mechanisms 40 and 41 are provided one in front of each clamping means. These key feeding mechanisms are similar to that type of coin feeding mechanisms common on amusement machines. This type of mechanism has two flat plates slideable relatively to one another, a first of the plates having a hole formed through it to accept a coin and the second plate providing a rest surface for the coin. When the coin is in position abutting the second plate, the first plate holding the coin is slid along the second plate and the coin is thus carried along into the machine.

However in the present mechanism the two plates are disposed vertically and the first plate has a recess formed in it to accept the head of the cut key blank respectively. The recess is aligned with the recess 20 formed between the jaws 17 and 18 so that when the first plate holding the cut key or key blank is slid inwardly the cut key or key blank is correctly positioned within the jaws of the clamping means.

A further positioning device is provided above the upper set of jaws of the clamping means which will hold the already cut key. This key positioning device comprises a friction wheel 37, carried on a spring loaded lever 35 which is pivoted about an axis 36. The friction wheel 37 is constantly rotated by means of a chain drive 38 driven by a sprocket wheel 39 carried on the lifting cam shaft 30.

The lever 35 is urged downwardly, by means of its associated spring, towards the jaws of the clamping means and will thus contact the top of any key placed therein. When the wheel contacts the key it tends to pull the key further into the jaws, thereby ensuring that the key is in the correct position.

When the second motor 10 is operative, it drives the crank wheel 11, the clamping cams 25 and the lifting cam 34. These items are pre-set so that the apparatus can carry out a predetermined sequence of operations which will now be described.

When commencing to cut a key on the machine, the carriage 2 is at a rear upper position, the two sets of clamping means 15 and 16 are open. Both electric motors 6 and 10 are started and an already cut key is placed in position between the jaws of the upper clamping means 15 and a blank to be cut is placed between the jaws 17 and 18 of the lower clamping means 16 as previously described. The second electric motor 10 rotates the crankwheel 11 and operates the chain drive 31 through the speed reduction gears.

During the first part of the sequence, the clamping cams 25 push their respective follower rods 24 to close the slideable jaws 17 towards the fixed jaws 18 for the purpose of clamping the cut key and the key blank. Each follower rod 24 pushes its ram head 22 (against the action of the spring acting between the jaws 17 and 18). Initially both the ram head 22 and the slideable jaw 17 move together, but when the jaw 17 encounters the resistance of the key or blank, the jaw ceases to move but the ram head 22 continues to move. This places the rubber pad between the slideable jaw 17 and the ram head 22 in compression and provides a knuckling effect which ensures that the key or blank is tightly held. The arrangement is such that the ram head 22 does not engage with the slideable jaws which ensures that the key or blank is necessarily under pressure.

The crank wheel 11 then pushes the carriage to its upper foremost position, where the stylus block 8 contacts the lever 35 and pushes it forwardly thereby moving the friction wheel 37 out of contact with the cut key. The cam drive then turns the lifting cam 34 through such an angle that the carriage is lowered until the stylus in block 8 bears upon the top edge of the cut key and takes the weight of the carriage 2. The machine is then ready to commence its cutting action, and during this part of its cycle, the lifting cam 34 is out of engagement with the carriage 2, so that the latter is supported only by the cut key engaging with the stylus. The carriage is then pulled along the length of the cut key by the action of the crank wheel 11 and crank rod 13 fastened to the carriage. As a result the carriage 2 is lifted in accordance with the contours of the cut key because the weight of carriage 2 is taken by the stylus 8. This has the effect of moving the rotary cutter 7 through the same undulating path as the stylus 8 and so this cutter cuts copy contours in the blank.

When the carriage 2 reaches the extremity of its rearward horizontal traverse and the blank has been cut into a copy of the original cut key, the lifting cam 34 lifts the carriage 2 back to its upper-most position when the stylus is clear of the cut key and the cutter is clear of the blank. The clamping cams 25 are then turned to release the jaws, the follower rod 24 and ram head 22 first move away thus releasing the compressional force on the rubber pad 22 and then the jaw 17 moves away from the jaw 18 under the action of the spring 51. Then the clamping cams 25 release the cut key and the blank which is at that stage a newly cut key. The machine is thus reset in its starting position. The two keys can then be removed and be substituted by another cut key and blank when required.

It will be understood that the above described machine can be equipped with a coin freed mechanism such that in its inoperative position both motors are stopped and the carriage 2 is in its rearmost and uppermost position. On release of the coin freed mechanism a blank will be released and both motors started. The purchaser will then place his own cut key and the blank which has been provided in the clamping means.

The above cutting sequence will then be carried out and when finished the motors will be stopped only to be started when the coin freed mechanism is again operated.

The coin freed mechanism could also include visual indicators for instance a green light adapted to be illuminated when the machine is inoperative and a red light adapted to be illuminated when the machine is operative. With this arrangement immediately the coin freed mechanism is operated the green light is extinguished and the red light illuminated. The red light will stay on until the key is cut and the apparatus returned to its inoperative position whereupon the green light will again be illuminated and the red light extinguished.

It will be understood that various modifications could be made to the machine without departing from the scope of the invention as set out in the appended claims, for instance the carriage could be adapted to have a counter balance weight or springs to help relieve the load on the stylus.

I claim:

1. Appparatus for producing copies of cut keys, the apparatus comprising:
    cut key clamping means for clamping a cut key which is to be copied during use of the apparatus;
    uncut key clamping means for clamping an uncut key which is to be cut;
    a stylus engageable with the contours of the cut key held by said cut key clamping means; a power driven cutter engageable with the uncut key held by said uncut key clamping means; a carriage coupling the stylus and power driven cutter together for movement in unison;
    a driving mechanism operable to drive the carriage and thereby drive the coupled stylus and cutter through a working stroke along the length of the cut and uncut keys respectively, and then drive the coupled stylus and cutter through a return stroke;
    mounting means mounting the carriage to permit movement of the coupled stylus and cutter transversely of the cut and uncut keys respectively during the working stroke; and displacement means which acts on the carriage on commencement of the return stroke to move the stylus and cutter laterally clear of the cut and uncut keys respectively.

2. Apparatus as claimed in claim 1, in which the displacement means comprises a cam means drivingly connected with said driving mechanism for the carriage.

3. Apparatus as claimed in claim 1, in which at least one clamping means has a rotary friction wheel operable to draw a key into the clamping means.

4. Apparatus as claimed in claim 1, in which at least one clamping means is drivingly connected to said driving mechanism for the carriage for operation by said driving mechanism prior to a working stroke.

5. Apparatus as claimed in claim 4, in which said clamping means has means for biasing the same into the open position, and cam means drivable by said driven mechanism to urge said clamping means into the closed position against the action of the bias.

6. Apparatus as claimed in claim 1, in which the said driving mechanism has a coin freed starter mechanism.

7. Apparatus as claimed in claim 6, in which there is an uncut key supply mechanism controlled by said coin freed starter mechanism.

8. An apparatus for cutting a blank key into a cut key so as to duplicate a master key comprising: first clamping means for releasably clamping a master key which is to be duplicated; second clamping means spaced-apart from said first clamping means for releasably clamping a blank key which is to be cut; and means for tracing the contour of the master key and simultaneously effecting cutting of the blank key so as to produce a cut key whose contour duplicates that of the master key comprising a stylus engageable with the master key for tracing the contour thereof, a driven cutter engageable with the blank key for cutting the same into a cut key, a movable carriage having said stylus and cutter mounted thereon in spaced-apart relationship, means mounting said carriage for reciprocable movement through a working stroke along the length of the master and blank keys to effect simultaneous tracing of the master key by said stylus and cutting of the blank key by said cutter and through a return stroke and for transverse movement in a direction transverse to said working and return strokes so as to move said stylus and cutter out of contact with the master and blank keys, drive means for driving said carriage through said working and return strokes to thereby effect cutting of the blank key into a cut key having a contour which duplicates that of the master key, and means for effecting transverse movement of said carriage during its return stroke so as to move said stylus and cutter out of contact with the master key and cut key.

9. An apparatus according to claim 8; wherein said first and second clamping means are vertically spaced apart a given distance; and said stylus and cutter are vertically spaced apart on said carriage a distance equal to said given distance.

10. An apparatus according to claim 9; wherein said means mounting said carriage includes means mounting said carriage so that it rests, through said stylus and cutter, on the master and blank keys during said working stroke.

11. An apparatus according to claim 8; wherein said means for effecting transverse movement of said carriage comprises a driven lifting cam acting on said carriage to lift the same during each return stroke thereof thereby moving said stylus and cutter out of contact with the master key and cut key, respectively, during each return stroke.

* * * * *